March 7, 1933.    O. CORADI ET AL    1,900,332
TRACING DEVICE FOR INSTRUMENTS SUCH AS INTEGRAPHS AND THE LIKE
Filed March 25, 1931    2 Sheets-Sheet 1
Fig. 1.
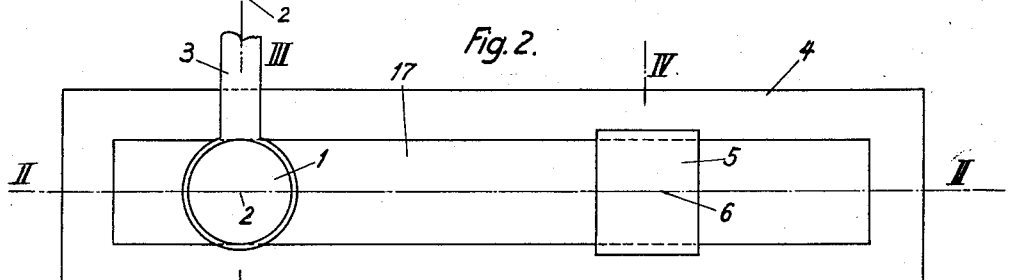
Fig. 2.
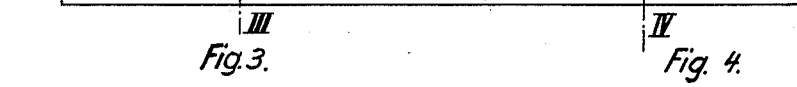
Fig. 3.  Fig. 4.
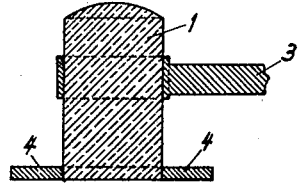 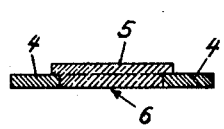
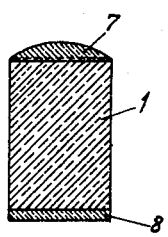 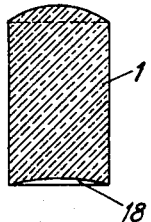
Fig. 5.  Fig. 6.  Fig. 7.
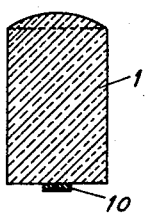 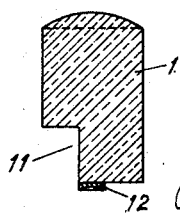
Fig. 8.  Fig. 9.

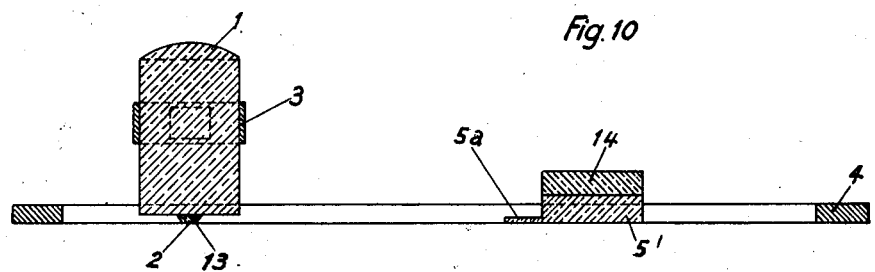
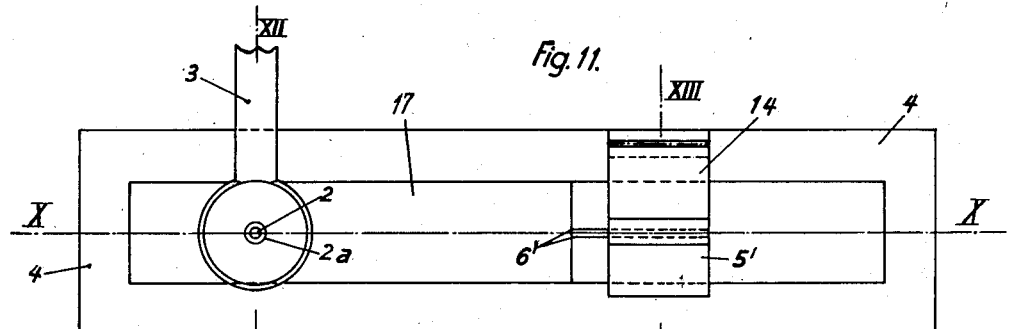
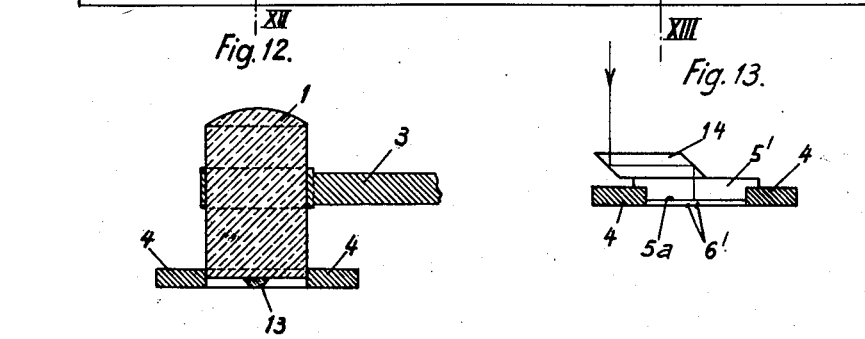
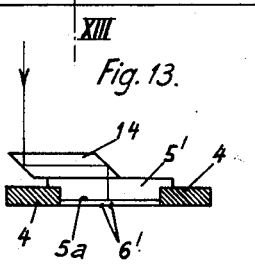
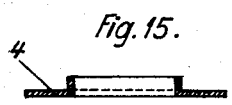

UNITED STATES PATENT OFFICE

OSWALD CORADI, OF ZURICH, AND WALTER LEEMANN, OF RUSCHLIKON NEAR ZURICH, SWITZERLAND

TRACING DEVICE FOR INSTRUMENTS SUCH AS INTEGRAPHS AND THE LIKE

Application filed March 25, 1931, Serial No. 525,216, and in Switzerland April 4, 1930.

The present invention relates to improvements in tracing devices for instruments such as integraphs and the like.

It is well known that in the use of integraphs, planimeters or other like instruments the guiding of the tracing needle so as to closely follow the area lines and the like is very tedious. To facilitate the work it has been proposed to replace the tracing needle by optical means such as magnifying lenses by which the line to be followed may be more easily traced. Moreover it has been proposed to use guides for the tracing needle to facilitate the tracing of straight lines.

The main object of the present invention is to improve these devices.

We attain this object by the provision of an improved device in which the magnifying lens, the tracing body and the indexing plate form one body, adapted to rest on the paper etc. with the lines to be traced.

In the drawings several modes of construction are shown by way of examples.

Fig. 1 is a longitudinal sectional view of an optical tracing device in accordance with this invention on the plane indicated by the line II-II of Fig. 2.

Fig. 2 is a plan of the same,

Fig. 3 is a section on line III-III of Fig. 2,

Fig. 4 is a section on line IV-IV of Fig. 2,

Figs. 5 to 9 are detail sections of modified forms of the tracing device,

Fig. 10 illustrates in sectional elevation on line X—X of Fig. 11, a modified construction of our improved device with guide, Fig. 11 is a top view of said device, Figs. 12 and 13 are cross-sections on lines XII-XII and XIII-XIII of Fig. 11 respectively, Figs. 14 and 15 show in cross-section different profiles of the guide bar.

In Figs. 1 to 4, 1 denotes a magnifying lens of suitable glass which is fixed in a bore of an arm 3 of an integraph or similar instrument (not shown in the drawings). The lower flat face of the lens 1 at the optical axis of the lens is provided with an index 2, which is preferably etched in the glass. The index mark 2 is clearly visible through the lens 1 and may be moved accurately over the area line to be traced as even small deviations from the proper course may be easily observed by the operator. If straight portions of a line are to be traced a guide 4 is used. The guide 4 is of solid material, preferably metal having a longitudinal slot 17. The breadth of the slot 17 corresponds exactly with the diameter of the lens 1. In the slot 17 a transparent plate 5 is slidably arranged. Said plate is provided with an index line 6 running exactly in the middle of the slot and parallel to the walls thereof. In using the guide 4 the lens 1 is placed with its index 2 on the line to be traced and is firmly held in said position. The guide 4 is now pivotally swung thereon to bring the index line 6 into position exactly over the line to be traced. The lens 1 is now moved longitudinally in slot 17 while the guide 4 is held stationary either to the end of the slot or the end of the straight section of the area line which is being traced. This process is continued until the entire area line is traced. In tracing curved area lines the guide is given free movement and follows the lens 1 without interfering with its movement and is again brought into position as described as soon as a straight section of the line follows.

The lens may consist of several parts firmly united by suitable cement as shown in Fig. 5. This composite lens comprises a plano-convex lens 7, the cylindrical glass body 1 and a circular, thin glass disk 8 in which the index 2 is etched. The disk 8 may be easily replaced if necessary. A lens as shown in Fig. 5 is especially adapted for use in combination with a compensating planimeter. The lenses having flat lower faces present some difficulties to keep them stationary, while the guide 4 is positioned. To facilitate the work, the lower face of the lens 1 may be provided with a concave cavity 18 as shown in Fig. 6. The index 2 is etched in the face of said cavity, and does not come in contact with the paper etc. A scratching of the face bearing the mark 2 is thus prevented.

The lens 1 may be further constructed as shown in Fig. 7. At the lower face a small disk 9 is arranged bearing the index 2. The disk 9 is cemented to the body of the lens 1 and may be replaced.

As shown in Fig. 8 the lower face of the disk 9 may be provided with a concave cavity 10 in which the mark 2 is etched. By these means the lens 1 may be easily and exactly placed on the line to be traced, the index does not touch the paper and moreover parallax is obviated.

In Fig. 9 a lens is shown having a disc 12 cemented to the body of the lens 1 the latter being provided with a recess 11.

The device shown in Figs. 10 to 13 comprises a lens 1 and a guide 4. The lens 1 which is fixed in the arm 3 of the instrument is provided at its lower flat face with a small body 13, of glass, transparent precious stone, or semi-precious stone, such as sapphire, agate etc. The body 13 is substantially an inverted cone. The larger plane thereof is cemented to the body of the lens 1. The smaller face of the body 13 bears the index or marking point 2, which has to follow the line of the area. The mantle of the body 13 is frosted or blackened. Seen through the lens the said mantle appears as a black ring 2a at the centre of which the mark 2 is visible. The lower face of body 13 may be concave as described above. The guide 4 is provided with a slot, in which a slide 5' is movable without being permitted to play. The slide 5' is transparent and is provided with two index lines 6' at its lower face. The lines 6' run parallel to each other and to the center line of slot 17. The slide 5' is moreover provided with a tongue 5a. The index lines 6' are extended over said tongue. The thickness of the part 5a is slightly less than the height of body 13. The tongue 5a may be pushed below lens 1 to abut on body 13. The guide 4 may be positioned by these means for very small straight portions of the line to be traced. On the transparent slide 5' a glass prism 14 is arranged which allows a reading of the lines 6' even when the slide 5' is below arm 3 of the integraph etc. The path of light is indicated by the arrow, Fig. 13. By using two lines 6' the correct setting of the slide 4 is facilitated. The use of a very hard and transparent material for the body 13 which slides on the paper etc. prevents the scratching of the face and any diminishing of the transparency. The slide 5' may be of other transparent material such as glass, celluloid or the like.

To make the guide very light in weight and yet stiff the cross-section thereof may be made either as shown in Fig. 14, in which the members of the guide 4 are of U-shaped cross-section, or as shown in Fig. 15 in which the members of guide 4 have an angular cross-section. A light metal alloy may be used for the guide.

We wish it clearly understood that we do not limit our invention to the particular device as shown and described, but what we wish to claim and secure by U. S. Letters Patent, is:—

1. In an instrument of the class described, a guide member, a transparent plate slidable longitudinally on the guide member and having an index line parallel with a side of the guide member, an arm at right angles to the guide member, and a cylindrical glass body carried by the arm and movable longitudinally of the guide member, said body forming a lens and having a curved upper face, and being provided at the lower end with an index mark for coaction with the index line of said transparent plate.

2. An instrument as claimed in claim 1, in which the guide member has a longitudinal parallel sided slot, the plate is slidably mounted in said slot, and the cylindrical glass body is also movable longitudinally in said slot.

3. An instrument as claimed in claim 1, in which the glass body has an attachment secured to its lower end, and has its index on said attachment.

4. An instrument as claimed in claim 1, in which the lower end of the glass body is concave.

5. An instrument as claimed in claim 1, in which the glass body has an attachment secured to its lower end, provided on its lower face with a cavity in which the index is located.

6. An instrument as claimed in claim 1, in which the glass body has a transparent attachment, harder than glass secured on its lower end and on which the index is located.

7. An instrument as claimed in claim 1, in which the glass body has an inverted truncated conical attachment secured to the lower end and provided with the index.

8. An instrument as claimed in claim 1, in which the glass body has an inverted truncated conical attachment secured to the lower end and provided with the index and the mantle of which attachment is blackened.

In testimony whereof we affix our signatures.

OSWALD CORADI.
WALTER LEEMANN.